Dec. 27, 1955  D. H. GRIFFIN ET AL  2,728,675
METHOD FOR MANUFACTURING SHORTENING
Filed Nov. 14, 1952
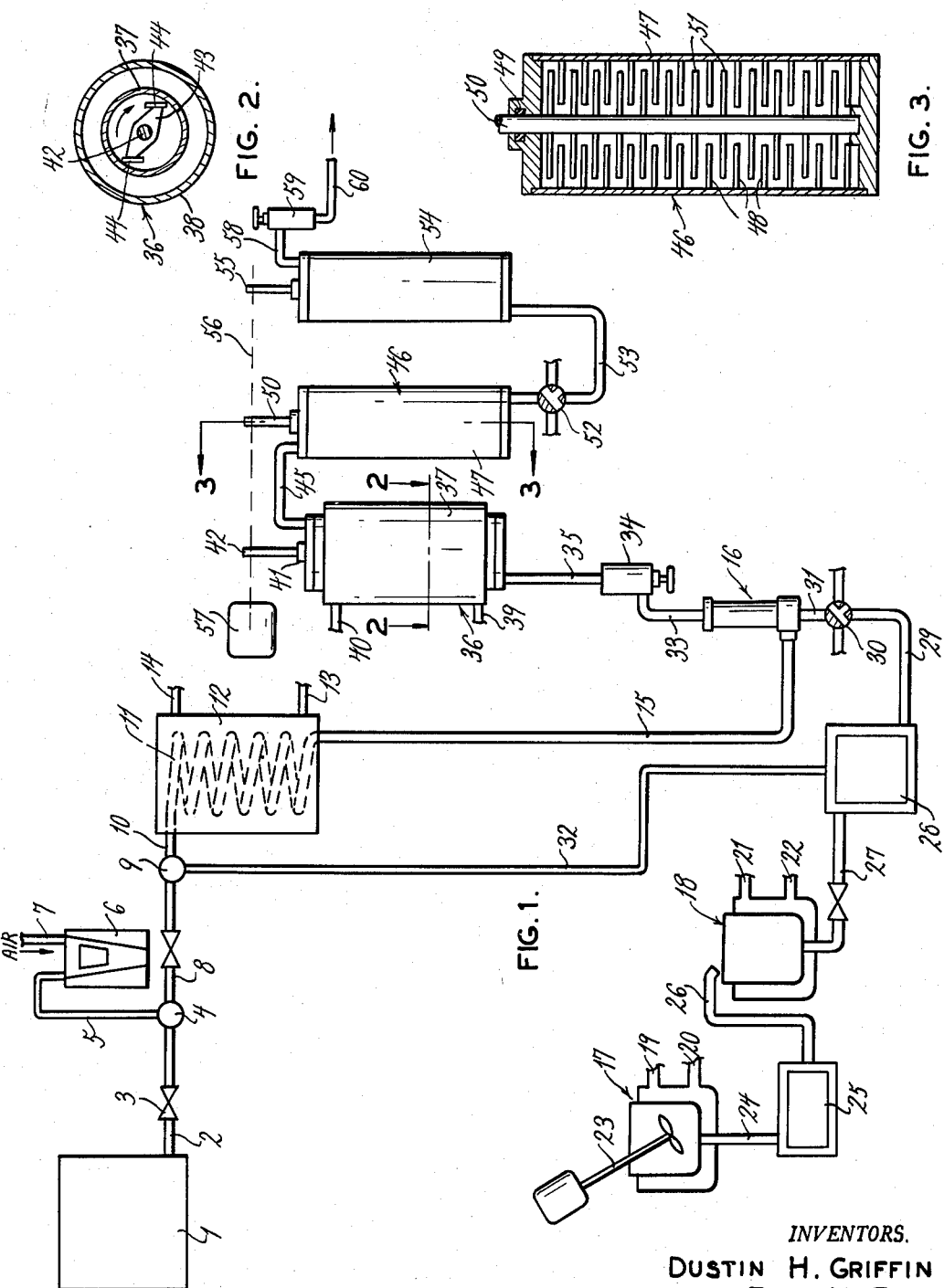
INVENTORS.
DUSTIN H. GRIFFIN
ROY N. FISS
LUCAS KIERS
BY Alfred v. Petchaft
ATTORNEY

United States Patent Office 2,728,675
Patented Dec. 27, 1955

2,728,675

METHOD FOR MANUFACTURING SHORTENING

Dustin H. Griffin, St. Louis, Mo., Roy N. Fiss, Belleville, Ill., and Lucas Kiers, Webster Groves, Mo., assignors to Hunter Packing Company, East St. Louis, Ill., a corporation of Illinois Application November 14, 1952, Serial No. 320,384

12 Claims. (Cl. 99—122)

This invention relates in general to certain new and useful improvements in methods and apparatus for manufacturing shortening and similar high-viscosity liquids-solids dispersions, and is related to our copending application Serial No. 264,858, filed January 4, 1952.

In recent years, much effort has been directed to the development and manufacture of so-called "high ratio" shortenings; that is to say, shortenings which make possible the formulation of a cake-batter having a sugar-flour ratio in excess of 1:1, without sacrificing volume, texture, and other desirable characteristics in the finished baked product. The "high ratio" shortenings now on the market however, produce only moderately good results in actual baking tests and are quite expensive, hence, there is a great need for an inexpensive shortening which will give improved baking results, such as greater volume, finer texture, increased moisture retention in the baked product and higher nutritional value.

It is the primary object of the present invention to provide methods and apparatus for the production of a high ratio shortening by incorporating phosphatidic material of animal origin in edible fats.

It is a second object of the present invention to provide methods and apparatus for the continuous production of a high ratio shortening at temperature ranges substantially below the melting point of the material being treated.

It is another object of the present invention to provide methods and apparatus for the production of high ratio shortening at elevated pressures.

It is a further object of the present invention to provide apparatus of the type stated which is compact, efficient, and capable of precise control, so that a uniform product of improved color and greater stability may be continuously produced with a minimum of labor and supervision.

It is an additional object of the present invention to provide a shortening which is relatively inexpensive and will yield improved bakery products, that is to say cakes having greater volume, finer texture and increased moisture retention.

With the above and other objects in view, our invention resides in the novel features of form, construction, arrangement, and combination of parts presently described and pointed out in the claims.

In the accompanying drawing—

Figure 1 is a schematic drawing showing a preferred form of apparatus embodying the present invention; and Figures 2 and 3 are transverse sectional views taken along lines 2—2 and 3—3, respectively, of Figure 1.

Broadly speaking, the present invention resides in the discovery that edible fats, such as lard, for example, when incorporated with a relatively small quantity of phosphatidic material derived from animal tissue, possesses unexpectedly improved properties as a shortening in bakery mixtures and that the bakery product, such as cakes for example, when prepared with such shortening has fine texture, great tenderness, large volume and increased moisture retention properties.

Referring now in more detail and by reference characters to the drawing, which illustrates a preferred embodiment of the present invention, 1 designates a conventional heated storage tank from which molten lard may be drawn through the pipe 2, and conventional cut-off valve or cock 3 by means of a pump 4. The lard preferably may be compounded with conventional quantities of mono- and di-glycerides, lard flakes and an anti-oxidant, such as Tenox II, which is a mixture of propyl 3, 4, 5 trihydroxy benzoate, butylated hydroxy anisole and citric acid in a suitable carrier, i. e. propylene glycol. Preferably, though not necessarily, a bleeder line 5 is connected to the suction side of the pump 4 through a rotometer 6 to a supply line 7, so that a small carefully measured quantity of air or inert gas is injected into the flow of molten lard as it passes through the pump 4. The pump 4 discharges the molten lard into the supply line 8 at a pressure of the order of 300 p. s. i. and consequently the entrained gas is highly compressed and dispersed or dissolved. From the supply line 8, the molten lard passes through a volumetric control 9 and then through a line 10 to a pre-cooling coil 11 mounted within a chill-tank 12, which is, in turn, connected by intake and return lines 13, 14, to a supply of cold water. The size of the coil 11, the rate of flow of hot lard, and the temperature of the cooling water are so regulated as to lower the temperature of the hot lard while still permitting the lard-air mixture to remain essentially fluid under the conditions of pressure imposed on it. From the cooling coil 11, the cooled, but still fluid, lard flows through inlet line 15 to an intermixing injector 16 which may be of any suitable type, such as that more particularly described in the above-mentioned copending application Serial No. 264,858.

Associated with the apparatus is a pair of open-topped water jacketed kettles 17, 18, preferably, though not necessarily, connected by lines 19, 20, and 21, 22, respectively, to a cold water supply, the kettle 17 being provided with a motor-driven propeller or turbine type agitator 23. An oil dispersion of animal phosphatides, that is to say a phosphatidic material derived from animal tissue, such as that disclosed in application Serial No. 173,011, and an edible oil such as refined corn oil is mixed in the kettle 17. In this connection, it may be noted that such phosphatidic material contains, among other things, phospholipids, such as sphyngomelins, cerebrosides and kefalin, which in some way seem to contribute to the novel result obtained, because it has been demonstrated in connection with the present invention that phosphatidic materials of vegetable origin, such as soya lecithin, for example, will not produce such results. The mixture of oil and phosphatidic material is conducted through discharge line 24 to a colloid mill 25 by which it is thoroughly dispersed and is then discharged through a line 26 to the other water jacketed kettle 18, at which point a predetermined quantity of lecithin is preferably added. It should be noted in this connection that the lecithin, if used at all, may be added in the storage tank 1 provided the temperature of the lard is kept below the decomposition temperature of lecithin.

The dispersion formed in the kettle 18 is, in turn, conducted through line 27 to a proportioning pump 28 having its discharge line 29 connected through a three-way valve 30 to the injection tube 31 of the intermixing injector 16. The proportioning pump 28 is governed by the volumetric control 9 to which it is connected by control-line 32. This control may be established either by hydraulic pressure, pneumatic pressure or suction in line 32, as may be desired. In this connection, it may be noted that electrical and electronic controls are also available for establishing cross-control to the proportioning pump.

The rate of flow through the control 9 establishes a directly following control response through line 32, which causes the proportioning pump 28 to transmit a greater or lesser flow of the prosphatide dispersion in accordance with some predetermined proportional relationship at substantially the same or slightly higher pressure as the lard-air dispersion, so as to be thoroughly interspersed throughout the lard-air dispersion and flow in a common stream therewith through a transfer pipe 33 to an extrusion chamber 34, which may also be of any suitable type, such as that more particularly described in the above-mentioned copending application Serial No. 264,858. From the extrusion chamber 34, the material flows through line 35, directly into a chilled crutcher 36 consisting of an elongated cylindrical shell 37 surrounded by a refrigerated jacket 38 connected to a conventional refrigerant system through a pressure line 39 and suction tube 40. Extending coaxially into the shell 37 through a rotary seal 41 is a shaft 42. Interiorly of the shell 37, the shaft 42 is provided with diametral arms 43 supporting a pair of obliquely presented scraper blades 44. In the crutcher 36, the lard is chilled and solidified to the consistency of a heavy paste and the oil-lecithin-phosphatide mixture is dispersed through the mass.

The crutcher 36 is connected by a pipe 45 to a first blender 46 consisting of an elongated cylindrical shell 47 interiorly provided with a plurality of radial spines or stationary pickers 48. Extending coaxially into the shell 47 through a rotary seal 49 is a shaft 50 provided with a plurality of radially projecting rotary pickers 51 arranged to clear the stationary pickers 48. In passing through the first blender 46, the lard-phosphatide-oil-lecithin-air dispersion is not materially changed in temperature or viscosity, but is appreciably smoothed out and rendered homogeneous and flows outwardly therefrom at a pressure of the order of 260 p. s. i. From the first blender 46, the lard-phosphatide-oil-lecithin-air dispersion passes through a three-way valve 52 and a transfer pipe 53 into a second blender 54, substantially identical in all respects to the first blender 46 and having a rotary shaft 55. At this point, it may be noted that the shafts 42, 50, 55, are all operatively connected through any suitable mechanical transmission means, schematically indicated by the dotted lines at 56, to a suitable motor-drive 57. In the second blender 54, the material is finally rendered homogeneous and the dispersion of lard, air, oil, lecithin, mono- and diglycerides and animal phosphatides forms a finished shortening which is discharged through line 58 into a second extrusion chamber 59, substantially identical with the extrusion chamber 34, and thence through a discharge line 60 to a conventional filling machine (not shown). It should be noted in this connection that although the point of injection of the oil-phosphatide dispersion is preferably shown prior to passage through the crutcher 36, injection into the lard-air-mono- and diglycerides mixture may be effected prior to first or second blender or other homogenizing device so long as complete intermixing is accomplished.

The three-way valves 30, 52, are employed so that material may be recycled or discharged into open catch-buckets when starting up the apparatus. Thus, it becomes possible to ascertain that a full and normal flow of material is passing through the first blender 46 and the discharge line 29 before throwing the two streams together in the intermixing injector 16. Consequently, the first bit of finished product coming through the line 60 will conform precisely to the desired quantitative specification.

For purposes of illustration, and not by way of limitation, the phosphatide oil dispersion preferably consists of approximately the following:

| | Pts. by wt. |
|---|---|
| Powdered animal phosphatides | 8–12 |
| Refined corn oil | 24–36 |
| Bleached lecithin | 8–12 |

The lard is preferably prepared as follows:

| | Pts. by wt. |
|---|---|
| Lard | 90–94 |
| Lard flakes | 4–6 |
| Antioxidant: | |
| Propyl 3, 4, 5 trihydroxy benzoate | .005–.015 |
| Butylated hydroxyanisole | .01–.03 |
| Citric acid (in propylene glycol) | .003–.006 |
| Mono- and diglycerides | 1–5 |

After passage through the colloid mill 25, the phosphatide oil dispersion is reduced to a smooth light colored creamy liquid which does not settle out and by means of the proportioning pump 28 from 1 to 6 pounds of this dispersion is injected for every 94 to 99 pounds of the lard-air dispersion. It should be noted, in this connection, that while the above specified ranges of ingredients have been found to produce satisfactory results, nevertheless once a specific choice of exact formulation within these ranges has been selected, the precise control of constituency is important and the present process and apparatus are uniquely adapted to permit maintenance of such precise control in order that the process may be carried out on a continuous basis at high production rate and with assurance of a high degree of uniformity in the product.

The finished shortening made by the above described process and employing the above described apparatus has been found to be extremely stable and to have a rich, creamy color. Of utmost importance, however, is the fact that shortening made in accordance with the present invention is an even more effective shortening than any of the conventional so-called "high ratio" shortenings hitherto available, since cakes baked with the shortening of the present invention have much greater volume, better texture, and longer resistance to staling than cakes baked with conventional "high ratio" shortenings.

While there is described herein a preferred process and arrangement of apparatus in accordance with the present invention and certain variants are suggested, nevertheless we do not intend to be limited except by the scope of the appended claims which are to be construed validly as broadly as the state of the prior art permits.

Having thus described our invention, what we claim and desire to secure by Letters Patent is:

1. The method of converting lard into a high-ratio shortening which comprises continuously introducing the lard into a closed system as a flowing stream and, while in said closed system, performing the following steps successively, namely, mixing a gas with a stream of molten lard, pumping molten lard-gas mixture into a cooling worm at high pressure, passing the lard-gas mixture through a chilling vessel at high pressure and subjecting it to agitation as it passes through the chilling vessel, said lard-gas mixture being reduced in temperature within the chilling vessel to such an extent that it loses its liquidity and is reduced to the viscosity of a free-flowing paste, forming a mixture of oil and animal phosphatides, colloidalizing the mixture to form a smooth dispersion, keeping the dispersion cool, pumping the cool dispersion to form a flowing stream, the volumetric rate-of-flow of which is precisely proportionate, at selected ratio, to the volumetric rate-of-flow of the lard-gas mixture into the cooling worm, injecting the proportioned flow of the dispersion at high pressure into the flowing stream of the lard-gas mixture, transmitting the combined dispersion and lard-gas mixture through an extrusion chamber in which the stream is rendered turbulent, passing the dispersion-lard-gas mixture through a first agitator at high pressure to produce a substantially smooth mixture, and passing the dispersion-mixture through a second agitator to produce a smoothly blended shortening.

2. The method of converting into a high-ratio shortening an edible fat which is relatively solid and non-fluid at room temperatures, that is to say temperatures below 90° F., which method comprises adjusting the temperature of the edible fat so that it is sufficiently fluid to be pumped through a pipe, pumping the fluid fat at high pressure through a chilling vessel and subjecting it to agitation as it passes through the chilling vessel, said fat being reduced in temperature within the chilling vessel to such an extent that it loses its liquidity and is reduced to the viscosity of a free-flowing paste, separately forming a mixture of animal phosphatides in an edible vehicle compatible with said fat, colloidalizing the mixture to form a smooth dispersion, pumping the dispersion to form a flowing stream, the volumetric rate-of-flow of which is precisely proportionate, at a selected ratio, to the volumetric rate-of-flow of said fat into the chilling vessel, injecting the proportioned flow of the dispersion at high pressure into the flowing stream of said fat prior to introduction into the chilling vessel, transmitting the dispersion-fat mixture through an extrusion chamber in which the stream is rendered turbulent, and passing the dispersion-fat mixture through an agitator to produce a smooth homogeneous shortening.

3. The method of converting into a high-ratio shortening an edible fat which is relatively solid and non-fluid at room temperatures, that is to say temperatures below 90° F., which method comprises adjusting the temperature of the edible fat so that it is sufficiently fluid to be pumped through a pipe, pumping the fluid fat at high pressure through a chilling vessel and subjecting it to agitation as it passes through the chilling vessel, said fat being reduced in temperature within the chilling vessel to such an extent that it loses its liquidity and is reduced to the viscosity of a free-flowing paste, separately forming a mixture of animal phosphatides in an edible vehicle compatible with said fat, colloidalizing the mixtures to form a smooth dispersion, pumping the dispersion to form a flowing stream, the volumetric rate-of-flow of which is precisely proportionate, at a selected ratio, to the volumetric rate-of-flow of said fat into the chilling vessel, injecting the proportioned flow of the dispersion at high pressure into the flowing stream of said fat prior to introduction into the chilling vessel, and passing the dispersion-fat mixture through an agitator to produce a smooth homogeneous shortening.

4. The method of converting into a high-ratio shortening an edible fat which is relatively solid and non-fluid at room temperatures, that is to say temperatures below 90 F., which method comprises adjusting the temperature of the edible fat so that it is sufficiently fluid to be pumped through a pipe, pumping the fluid fat at high pressure through a chilling vessel and subjecting it to agitation as it passes through the chilling vessel, said fat being reduced in temperature within the chilling vessel to such an extent that it loses its liquidity and is reduced to the viscosity of a free-flowing paste, separately forming a mixture of animal phosphatides in an edible vehicle compatible with said fat, colloidalizing the mixture to form a smooth dispersion, pumping the dispersion to form a flowing stream, the volumetric rate-of-flow of which is precisely proportionate, at a selected ratio, to the volumetric rate-of-flow of said fat into the chilling vessel, injecting the proportioned flow of the dispersion at high pressure into the flowing stream of said fat prior to introduction into the chilling vessel, transmitting the dispersion-fat mixtures through an extrusion chamber in which the stream is rendered turbulent, passing the dispersion-fat mixture through a first agitator at high pressure, and passing the dispersion-fat mixture through a second agitator to produce a smooth homogeneous shortening.

5. The method of converting lard into a high-ratio shortening which comprises continuously introducing the lard into a closed system as a flowing stream and, while in said closed system, performing the following steps successively, namely, adjusting the temperature of the lard to render it sufficiently fluid to be pumped through a pipe, puumping fluid lard through a chilling vessel at high pressure and subjecting it to agitation as it passes through the chilling vessel, said lard being reduced in temperature within the chilling vessel to such an extent that it loses its liquidity and is reduced to the viscosity of a free-flowing paste, forming a mixture of animal phosphatides in an edible vehicle compatible with lard, colloidalizing the mixture to form a smooth dispersion, pumping the dispersion to form a flowing stream, the volumetric rate-of-flow of which is precisely proportionate, at a selected ratio, to the volumetric rate-of-flow of the lard into the chilling vessel, injecting the proportioned flow of the dispersion at high pressure into the flowing stream of the lard prior to introduction into the chilling vessel, and passing the dispersion-lard mixture through an agitator to produce a smoothly blended shortening.

6. The method of converting lard into a high-ratio shortening which comprises continuously introducing the lard into a closed system as a flowing stream and, while in said closed system, performing the following steps successively, namely, adjusting the temperature of the lard to render it sufficiently fluid to be pumped through a pipe, pumping fluid lard through a chilling vessel at high pressure and subjecting it to agitation as it passes through the chilling vessel, said lard being reduced in temperature within the chilling vessel to such an extent that it loses its liquidity and is reduced to the viscosity of a free-flowing paste, forming a mixture of animal phosphatides in an edible vehicle compatible with lard, colloidalizing the mixture to form a smooth dispersion, pumping the dispersion to form a flowing stream, the volumetric rate-of-flow of which is precisely proportionate, at a selected ratio, to the volumetric rate-of-flow of the lard into the chilling vessel, injecting the proportioned flow of the dispersion at high pressure into the flowing stream of the lard prior to introduction into the chilling vessel, passing the dispersion-lard mixture through a first agitator at high pressure, and passing the dispersion-lard mixture through a second agitator to produce a smoothly blended shortening.

7. The method of converting into a high-ratio shortening an edible fat which is relatively solid and non-fluid at room temperatures, that is to say temperatures below 90° F. which method comprises adjusting the temperature of the edible fat so that it is sufficiently fluid to be pumped through a pipe, pumping the fluid fat at high pressure through a chilling vessel and subjecting it to agitation as it passes through the chilling vessel, said fat being reduced in temperature within the chilling vessel to such an extent that it loses its liquidity and is reduced to the viscosity of a free-flowing paste, separately forming a mixture of animal phosphatides in an edible oil compatible with said fat, colloidalizing the mixture to form a smooth dispersion, pumping the dispersion to form a flowing stream, the volumetric rate-of-flow of which is precisely proportionate, at a selected ratio to the volumetric rate-of-flow of said fat into the chilling vessel, injecting the proportioned flow of the dispersion at high pressure into the flowing stream of said fat prior to introduction into the chilling vessel, transmitting the dispersion-fat mixture through an extrusion chamber in which the stream is rendered turbulent, passing the dispersion-fat mixture through a first agitator at high pressure, and passing the dispersion-fat mixture through a second agitator to produce a smooth homogeneous shortening.

8. The method of converting lard into a high-ratio shortening which comprises continuously introducing the lard into a closed system as a flowing stream and, while in said closed system, performing the following steps successively, namely, adjusting the temperature of the lard so that it is sufficiently fluid to be pumped, pumping the molten lard into a cooling worm at high pressure, passing the lard mixture through a chilling vessel at high pressure and subjecting it to agitation as it passes through the chilling vessel, said lard being reduced in temperature within the chilling vessel to such an extent that it loses its liquidity and is reduced to the viscosity of a free-flowing paste, forming a dispersion of animal phosphatides in edible oil, colloidalizing the dispersion, pumping the dispersion to form a flowing stream, the volumetric rate-of-flow of which is precisely proportionate, at a selected ratio, to the volumetric rate-of-flow of the lard into the cooling worm, injecting the proportioned flow of the dispersion at high pressure into the flowing stream of the lard, passing the combined lard-dispersion mixture through a first agitator at high pressure, and passing the dispersion mixture through a second agitator to produce a smoothly blended shortening.

9. The method of converting lard into a high-ratio shortening which comprises continuously introducing the lard into a closed system as a flowing stream and, while in said closed system, performing the following steps successively, namely, adjusting the temperature of the lard so that it is sufficiently fluid to be pumped, pumping the molten lard into a cooling worm at high pressure, passing the lard mixture through a chilling vessel at high pressure and subjecting it to agitation as it passes through the chilling vessel, said lard being reduced in temperature within the chilling vessel to such an extent that it loses its liquidity and is reduced to the viscosity of a free-flowing paste, forming a dispersion of animal phosphatides in edible oil, colloidalizing the dispersion, pumping the dispersion to form a flowing stream, the volumetric rate-of-flow of which is precisely proportionate, at a selected ratio, to the volumetric rate-of-flow of the lard into the cooling worm, injecting the proportioned flow of the dispersion at high pressure into the flowing stream of the lard prior to introduction of the chilling vessel, passing the combined lard-dispersion mixture through a first agitator at high pressure, and passing the dispersion mixture through a second agitator to produce a smoothly blended shortening.

10. The method of converting lard into a righ-ratio shortening which comprises continuously introducing the lard into a closed system as a flowing stream and, while in said closed system, performing the following steps successively, namely, mixing a gas with a stream of molten lard, pumping molten lard-gas mixture into a cooling worm at high pressure, passing the lard-gas mixture through a chilling vessel at high pressure and subjecting it to agitation as it passes through the chilling vessel, said lard-gas mixture being reduced in temperature within the chilling vessel to such an extent that it loses its liquidity and is reduced to the viscosity of a free-flowing paste, forming a mixture of oil and phosphatidic material derived from animal tissue, colloidalizing the mixture to form a smooth dispersion, keeping the dispersion cool, pumping the cool dispersion to form a flowing stream, the volumetric rate-of-flow of which is precisely proportionate, at selected ratio, to the volumetric rate-of-flow of the lard-gas mixture into the cooling worm, injecting the proportioned flow of the dispersion at high pressure into the flowing stream of the lard-gas mixture, transmitting the combined dispersion and lard-gas mixture through an extrusion chamber in which the stream is rendered turbulent, passing the dispersion-lard-gas mixture through a first agitator at high pressure to produce a substantially smooth mixture, and passing the dispersion-mixture through a second agitator to produce a smoothly blended shortening.

11. The method of converting into a high-ratio shortening an edible fat which comprises adjusting the temperature of the edible fat to render it sufficiently fluid to be pumped through a pipe, pumping the fluid edible fat through a chilling vessel at high pressure and subjecting it to agitation as it passes through the chilling vessel, said edible fat being reduced in temperature within the chilling vessel to such an extent that it loses its liquidity and is reduced to the viscosity of a free-flowing paste, mixing phosphatidic material derived from animal tissue with an edible vehicle compatible with said edible fat, colloidalizing the mixture to form a smooth dispersion, pumping the dispersion to form a flowing stream, the volumetric rate-of-flow of which is precisely proportionate, at a selected ratio, to the volumetric rate-of-flow of the edible fat into the chilling vessel, injecting the proportioned flow of the dispersion at high pressure into the flowing stream of edible fat prior to introduction into the chilling vessel, and passing the dispersion-fat mixture through an agitator to produce a smoothly blended shortening.

12. The method of converting into a high-ratio shortening an edible fat which comprises adjusting the temperature of the edible fat to render it sufficiently fluid to be pumped through a pipe, pumping the fluid edible fat through a chilling vessel at high pressure and subjecting it to agitation at it passes through the chilling vessel, said edible fat being reduced in temperature within the chilling vessel to such an extent that it loses its liquidity and is reduced to the viscosity of a free-flowing paste, mixing phosphatidic material derived from animal tissue with an edible vehicle compatible with said edible fat, colloidalizing the mixture to form a smooth dispersion, pumping the dispersion to form a flowing stream, the volumetric rate-of-flow of which is precisely proportionate, at a selected ratio, to the volumetric rate-of-flow of the edible fat into the chilling vessel, injecting the proportioned flow of the dispersion at high pressure into the flowing stream of edible fat, and passing the dispersion-fat mixture through an agitator to produce a smoothly blended shortening.

References Cited in the file of this patent

UNITED STATES PATENTS

| 1,645,742 | Fee et al. | Oct. 18, 1927 |
| 2,024,647 | Joyce | Dec. 17, 1935 |
| 2,062,782 | Epstein et al. | Dec. 1, 1936 |

FOREIGN PATENTS

| 9,502 | Australia | Oct. 4, 1932 |

OTHER REFERENCES

"Lecithin in Food Processing," by Aylward, Food Manufacture, July 1952, pages 285–287.

"Industrial Oil and Fat Products," by Bailey, second edition, Interscience Publishers, Inc., New York, 1951, pages 920–924.